(12) United States Patent
Brombach et al.

(10) Patent No.: US 12,025,102 B2
(45) Date of Patent: Jul. 2, 2024

(54) CONTROLLER AND METHOD FOR A WIND TURBINE AS WELL AS COMPUTER PROGRAM

(71) Applicant: Wobben Properties GmbH, Aurich (DE)

(72) Inventors: Johannes Brombach, Berlin (DE); Swantje Amelsberg, Berne (DE); Helge Giertz, Leer (DE); Alexander Poolmann, Ihlow (DE)

(73) Assignee: Wobben Properties GmbH, Aurich (DE)

( * ) Notice: Subject to any disclaimer, the term of this patent is extended or adjusted under 35 U.S.C. 154(b) by 22 days.

(21) Appl. No.: 17/945,925

(22) Filed: Sep. 15, 2022

(65) Prior Publication Data
US 2023/0079158 A1 Mar. 16, 2023

(30) Foreign Application Priority Data

Sep. 16, 2021 (EP) ..................................... 21197221

(51) Int. Cl.
*F03D 7/04* (2006.01)
(52) U.S. Cl.
CPC ............. *F03D 7/048* (2013.01); *F03D 7/043* (2013.01); *F05B 2270/328* (2013.01);
(Continued)
(58) Field of Classification Search
CPC .... F03D 7/048; F03D 7/043; F05B 2270/328; F05B 2270/329; F05B 2270/331
See application file for complete search history.

(56) References Cited

U.S. PATENT DOCUMENTS

7,175,389 B2 * 2/2007 Moroz .................. F03D 7/0264
416/37
10,132,295 B2 * 11/2018 Lund ....................... F03D 7/043
(Continued)

*Primary Examiner* — Michael L Sehn
(74) *Attorney, Agent, or Firm* — Seed IP Law Group LLP (57) ABSTRACT

The invention relates to a controller for a wind turbine with an operating software for operating the wind turbine, wherein the operating software is set up to regulate or control at least an electrical output of a wind turbine generator, a speed of a wind turbine rotor, an azimuth angle of a wind turbine nacelle, and a pitch angle of at least one rotor blade of the wind turbine rotor, wherein the operating software comprises a core module and at least one customer application. The customer application is set up to determine a parameter, in particular a control variable, in particular a target value, depending on at least one function of the customer application, and provide it for the core module. The core module is set up to detect and/or predict a load acting on the wind turbine during an operation of the wind turbine, and in a case where a detected or predicted load lies below a predefined load limit, to operate the wind turbine as a function of the parameter provided by the customer application, and in a case where a detected or predicted load exceeds the predefined load limit, to adjust the prepared parameter and leave the wind turbine unconsidered as a function of the adjusted parameter or the provided parameter, and operate the wind turbine with a parameter determined in the core module. The controller further has a first programming interface and a second programming interface, wherein the first programming interface is set up to program the core module, in particular the load limits, and wherein the second programming interface is set up to program the customer applications, in particular their function, and prevent the core module from being reprogrammed via the second programming interface. The invention further relates to a method for a controller and a computer program product.

20 Claims, 3 Drawing Sheets

(52) U.S. Cl.
CPC ... *F05B 2270/329* (2013.01); *F05B 2270/331* (2013.01); *F05B 2270/337* (2013.01)

(56) References Cited

U.S. PATENT DOCUMENTS

2010/0274400 A1 10/2010 Ormel et al.
2020/0291924 A1 9/2020 Grove et al.

\* cited by examiner

CONTROLLER AND METHOD FOR A WIND TURBINE AS WELL AS COMPUTER PROGRAM

BACKGROUND

Technical Field

The invention relates to a controller of wind turbines.

Description of the Related Art

A typical lifetime for a wind turbine is here assumed to be about 25 to 30 years. In order to achieve this, load models are defined for the wind turbine, to which the operating modes are oriented. In operation, operating modes are provided that trigger a short-term overload against the backdrop of the load models by a corresponding controller of the wind turbine. Such operating modes or modes of operation do not lead directly to any damage to wind turbine, but merely reduce its total operating time or the operating time of individual components. However, such operating modes are only selected in rare situations, for example to support a network or in other cases that are unexpected and do not reflect regular operation, so that a predefined lifetime is statistically reached. As a consequence, the functions of the operating software for performing the operating modes are fixed, and here oriented primarily to requirements and preconditions of the network as well as predefined compensation benchmarks.

In the past, when remuneration for energy fed into the grid by the wind turbine was contractually firmly regulated over essentially the entire lifetime, and when wind turbines had no special network support functions, this type of wind turbine operation was a solution suitable for the system operator for operating the wind turbine. Recently, however, the framework conditions are changing with increasing frequency during the lifetime of a wind turbine. Such changing framework conditions involve political decisions with regard to remuneration, increasingly stringent environmental regulations, changing developments in the environment, and rising requirements by the network operator. The individual, changing framework conditions are in part directly connected with each other. For example, new network support tasks are rewarded with a suitable remuneration if fulfilled by the company.

In order to adjust wind turbine operation for these changing framework conditions, for example with additional modes of operation, the operating software must be updated, which as a rule can only be done by the wind turbine manufacturer. Therefore, given different changes in the framework conditions for wind turbines in various territorial areas, the operating software for each of the wind turbine groups of an area must be individually customized. In particular, even changing framework conditions that relate only to individual wind turbines must here also be considered. Therefore, the operating software must be routinely and individually customized or updated for ideally adapted wind turbine operation under the framework conditions valid for the wind turbine. This leads to an expenditure and a cost factor associated therewith, which makes the already shrinking margins during wind turbine operation increasingly unprofitable.

BRIEF SUMMARY

One or more embodiments are directed to the ability to routinely adjust the operation of a wind turbine to the changing framework conditions, without the manufacturer having to completely update the operating software for this purpose.

Wind turbines are known, and have a controller so as to control the operation of the wind turbine. The controller is here based upon an operating software that can perform various operating modes. For example, the operating modes are selected in the operating software by a sensor system or operator specifications. The operating modes are here tailored in such a way as to allow the wind turbine to operate over its entire lifetime.

One embodiment is directed to a controller for a wind turbine with an operating software for operating the wind turbine. The operating software is here set up to regulate or control at least an electrical output of a wind turbine generator, a speed of a wind turbine generator, an azimuth angle of a wind turbine nacelle, and a pitch angle of at least one rotor blade of the wind turbine rotor. Therefore, the operating software serves in particular to control or regulate essentially all components of the wind turbine to be regulated or controlled, preferably those serving to generate electrical energy. For example, this includes a direct control or regulation of the corresponding components of the wind turbine by the operating software, but also an indirect control or regulation. In an indirect control or regulation, for example, the operating software only specifies a default for another controller that is connected with the wind turbine controller, which can also be referred to as component controller, or another module. This component controller then handles the actual control or regulation of the component provided for the other controller or other module.

The operating software further comprises a core module and at least one customer application. Therefore, the operating software preferably has a modular design. A first module of the operating software is thus the core module, and another module of the operating software is a customer application.

The customer application is further set up to determine a parameter depending on at least one function of the customer application. This means that the customer application comprises at least one function, which, preferably as the output value, determines a parameter. This parameter is further provided by the customer application for the core module. For example, a parameter is preferably any value, such as a variable, which is assigned to a function for operation. One example for a parameter is a desired value for regulating an active power output of the wind turbine to the network. Furthermore, a parameter can also be understood as a control command, with which functions, such as bat protection functions, can be turned on or off.

The core module is further set up to detect or predict a load exerted on the wind turbine during an operation of the wind turbine. If the core module detects or predicts such a load lying below a predefined load limit, the wind turbine is operated as a function of the parameters provided by the customer application. In a case where the detected or predicted load exceeds the predefined load limit, the parameter provided by the customer application is adjusted, and the wind turbine is operated as a function of the adjusted parameter. This parameter is preferably adjusted in the core module itself. Alternatively, in the case of a detected load or a predicted load that exceeds the predefined limit, the parameter provided by the customer application is left unconsidered, and the wind turbine is operated with a parameter that is determined or stored in the core module.

The predefined load limit is preferably an upper load limit or a reference load limit. An upper load limit describes a limit established by tests, simulations and/or calculations that must not be exceeded, since if exceeded, damage would be done to the component for which the load limit is defined. By contrast, a reference load limit is a limit likewise established by tests, simulations and/or calculations, which as long as not exceeded, normally leads to a reference lifetime, e.g., 20 years. Therefore, while exceeding a reference load limit would not directly lead to damage, it would reduce the lifetime of the component relative to the reference lifetime.

The core module is preferably set up to detect or predict several loads exerted on the wind turbine during an operation of the wind turbine. An assigned load limit is then correspondingly defined for each of the exerted loads. For example, in this case, where all loads lie below their assigned load limits, the wind turbine is operated as a function of the parameters provided by the customer application. In a case where only one of the loads exceeds its load limit, the parameter is already adjusted, and the wind turbine is operated as a function of the adjusted parameters.

At the detected or predicted load, it is especially preferred that precisely those loads be considered which are or can be affected by the parameter provided by the customer application.

In addition, the controller has a first programming interface and a second programming interface. The first programming interface is set up to program the core module, in particular the load limits or operating functions executed in the core module in order to operate the wind turbine. The second programing interface is further set up to program the customer application, in particular its function. In addition, the second programming interface is set up to prevent the core module from being programmed or reprogrammed via the second programming interface.

Therefore, the operating software for controlling a wind turbine comprises several modules, which can be programmed via separate programming interfaces. The core module is used for controlling and regulating, meaning preferably for automatedly operating, the wind turbine, and for monitoring the load on the wind turbine. The core module can perform this operation as a function of parameters, which in turn are provided by a customer application. During operation of the wind turbine, however, the core module acts as a safeguard to adjust or ignore these parameters if this leads to an overload case, so that no operating mode is implemented that can result in damage to the wind turbine. However, the customer application, which can be programmed via a separate programming interface, further provides the user with the option of specifying individual functions for operating the wind turbine, whose parameters are then considered by the core module during operation.

However, while this results in an individual programming of a wind turbine via a customer application for adjusting the operating behavior of the wind turbine, a safe and faultless operation of the wind turbine continues to be ensured by the core module, which cannot be changed via the programming interface with which the customer application can be programmed.

This makes it possible for the customer or operator to individually adjust the operation of each separate wind turbine without endangering safe operation.

In a first embodiment, access to the first programming interface is protected by a first safety device. Access to the second programming interface is protected by a second safety device, which preferably differs from the first safety device. This means that each of the two programing interfaces, namely the first programming interface and the second programming interface, has its own respective safety device. Furthermore, these safety devices preferably differ from each other. Safety devices are basically known, and for example comprise authenticating a user, who is then authenticated for accessing the programming interface. For example, authentication requires that a username and a password be entered. If reference is here made to two different safety devices, the difference in the safety devices can in one embodiment lie in differing access data, such as usernames and/or passwords. However, it can also be the case that the first safety device has a comparatively safer design than the second safety device, for example because only a username and password are required for authentication and authentification, wherein the first safety device additionally requires a one-time password or a token for authentication and authentification at the first programming interface. Therefore, it is especially preferred that a higher level of security be selected for access to the first programming interface by the first safety device than for access to the second programming interface with the second safety device.

This ensures that a person authorized to access the second programming interface can also access the first programming interface only in exceptional cases, for example if he or she belongs to a specific group of people, for example an installer or manufacturer of the wind turbine. The group of people, for example which includes the operator, who can usually access the second programming interface, will thus as a rule be unable to overcome the first safety device and access the first programming interface, so that the core module is protected against reprogramming by this group of people. This means that an operator or user of the wind turbine can thus access the second programming interface via the second safety device based upon his or her access authorization, so as to adjust the customer application and thereby individually adjust an operation of the wind turbine. By contrast, however, the core module provided for general safety aspects of the wind turbine is protected against any reprogramming by the operator or user.

According to another embodiment, at least one additional customer application can be incorporated into the operating software via the second programming interface. This additional customer application preferably has at least one additional function. The additional function also serves to provide one or more parameters for the core module. As a consequence, not only can a present customer application be altered by a wind turbine user, so as to adjust wind turbine operation, but any functions in new customer applications can even be provided and integrated into the operating software by a user. Therefore, wind turbine actuation can be adjusted via several parameters of varying applications. For example, a first customer application serves to generate individual, time-controlled commands for controlling a bat protection function, while a second customer application specifies target values for regulating the energy to be supplied.

According to another embodiment, the controller comprises at least one sensor interface. The sensor interface serves to receive one or several sensor data from sensors of the wind turbine itself, or from a unit connected with the wind turbine, for example a wind measurement mast. Furthermore, the core module is set up to provide the sensor data or sensor data derived from the sensor data with the core module for the customer application or the additional customer application. The customer application or additional customer application is also set up to determine the parameter for the core module depending on the at least one function stored in the customer application, and additionally depending on the sensor data or the derived sensor data.

As a consequence, the core module can directly access sensor data of the wind turbine or a unit connected with the wind turbine, for example a wind measurement mast, so as thereby consider current sensor data while generating the parameter for the controller. In this way, wind turbine regulation, which is actually implemented with the core module, can be handled completely with a customer application, making it individually adjustable. During implementation by the customer application, however, the operating software always checks whether this implementation can result in damage to the system, and only acts on the operation in such cases.

According to another embodiment, the operating software comprises an application interface between the core module and the customer application, so as to transfer parameters from the customer application to the core module, as well as to transfer sensor values or status data that indicate the operating state of the wind turbine from the core module to the customer application. The application interface is preferably set up to transfer as the parameter a control command or a variable, which in particular comprises a target value for regulation or a manipulated variable.

As a consequence, the application interface is directly realized in the operating software, thereby enabling a direct communication between the modules of the operating software. Furthermore, the core module and customer application are in this way clearly separated from each other and secured against each other by the application interface, since the application interface can clearly define which data can be exchanged between the customer application and the core module.

According to another embodiment, the controller is a component of wind farm regulator or a wind turbine. Alternatively, the controller is a distributed controller and at least partially a component of a control center, a wind farm regulator, a wind turbine controller and/or another, in particular remote computer. The core module is especially preferably arranged or arrangeable in the wind turbine or wind farm regulator. The customer application or the additional customer application is arranged or arrangeable in the control center or the additional computer. In another alternative, varying customer applications are further arranged in varying and locally separated computer units, wherein the computer units each have a second programming interface.

Therefore, provided are controllers that are completely arranged directly in a wind turbine or a wind farm regulator on the one hand, but also controllers that are distributed controllers on the other. It is here especially preferable that the core module be a component of a wind turbine, so as to control the wind turbine. However, the customer application can be run in a control center, for example, which represents a higher-level instance, and is connected with several wind farms, so that operation can also be influenced remotely. In another preferred alternative, the customer application is run on another computer, for example which can also be a mobile device, like a laptop or a mobile phone. Therefore, a parameter for operating the wind turbine can be provided remotely.

According to another embodiment, the controller is connected with at least one controllable or regulatable hardware component of the wind turbine. The hardware component is preferably a hardware component of the wind turbine. Furthermore, the core module is set up to control or regulate the hardware component. The hardware component is here controlled or regulated via the core module as a function of parameters, which are control commands or variables, and received via the application interface from the customer application. Such hardware components comprise components that in particular affect the operation of the wind turbine. For example, such components are components for regulating or controlling the electrical power of a wind turbine generator, controlling or regulating the speed of a wind turbine rotor, controlling or regulating an azimuth angle of a wind turbine nacelle and/or controlling or regulating at least one pitch angle of at least one rotor blade of the wind turbine rotor.

According to another embodiment, the core module comprises a conflict management module. The conflict management module is set up to check parameters, preferably comprising control commands or variables received via the application interface from the customer application, for conflicts with operating functions implemented by the core module. Alternatively or additionally, the conflict management module is set up to check parameters received via the application interface for conflicts with parameters received from the additional customer application via the application interface.

Therefore, the conflict management module serves to identify conflicts that arise if an operation of the wind turbine performed by the core module leads to an unsafe or faulty state of the wind turbine owing to parameters received from the customer application. In addition, a check is performed to determine whether parameters received from varying customer applications would cause such an unsafe or faulty state of the wind turbine. Examples for such conflicts include a parameter received from the customer application that requests a wind turbine stoppage, while the other customer application transmits a control command via the application interface that requires a maximum possible generation of electrical energy by the wind turbine. For example, a conflict would further be detected if the core module stopped wind turbine operation for a maintenance interval, while the customer application requested a wind turbine operation. Even varying target values requested by varying customer applications for the same regulation, for example varying power reductions of the wind turbine, can thus be viewed as a conflict.

As a consequence, the detection of a conflict does not constitute the detection of a wind turbine overload, for example which is caused by unsuitable parameters received via the application interface; the detection of conflicts with the conflict management module instead serves to decide which of the conflicting parameters is to be implemented. In the case of a detected conflict, the parameter(s) received via the application interface are not considered, wherein it is especially preferable that an operation only be implemented as a function of parameters and operating functions of the core module. According to another embodiment, a priority is assigned to each of the parameters, or at least to several of the parameters. In the case of a conflict between two parameters, the prioritization of parameters is then examined, so as to consider the parameter having the higher priority during operation. Therefore, a higher priority is preferably assigned to a parameter that initiates a network support measure, for example, than to a parameter that initiates a bat protection or normal operation.

According to another embodiment, the core module comprises a residual runtime determining unit, which is set up, after receiving a parameter or an altered parameter from the customer application, to determine or estimate the residual lifetime of the wind turbine estimated using this parameter, and transfer the residual lifetime to the customer application.

Alternatively or additionally, the core module comprises a runtime consumption determining unit, which is set up, after receiving a parameter or an altered parameter from the customer application, to determine or estimate a runtime consumption estimated using this parameter, and transfer it to the customer application. For example, the runtime consumption determining unit can output a value lying between a lower value, e.g., 0 or 0.2, and an upper value, e.g., 2 or 3. This value says how much lifetime or runtime is consumed by comparison to the reference lifetime during the current operating state. For example, if a customer application leads to a value, which can also be referred to as a runtime consumption indicator, of 2, then the lifetime of the system is reached twice as fast, meaning halved in absolute terms. At a value of 1, the lifetime assumed in the datasheet is exactly reached. Operating states with a runtime consumption indicator of less than 1 reflect a very gentle operating mode, which leads to a very low runtime consumption or lifetime consumption. For example, this can involve states with a greatly reduced output power.

By retrieval, the operator can thereby make a direct inference as to the impact of his or her individual adjustment of operation, so as to adjust the customer applications as necessary.

According to another embodiment, the controller is connected with a network, namely a data network for data transmission. Furthermore, the controller is set up to transmit data received from the core module, such as the residual lifetime, in particular state data for the controller or another unit or component of the wind turbine connected with the controller, for example a sensor, via the network depending on a function of the customer application.

Therefore, sensor data or state data are provided to the customer application from the core module, and a customer can adjust or provide functions of the customer application that enable transmission of these data via the network, for example to a mobile device, like a mobile phone. Apart from individually programming the controller of the wind turbine, this makes it possible for an operator to also define individual queries of the operating state of the wind turbine via the customer application.

According to another embodiment, the controller is connected with the network and set up to receive data through the customer application via the network depending on a function of the customer application. In addition, the customer application is set up to transmit the received data or data derived from the latter with the function to the core module via the application interface, in particular as parameters. As a consequence, the customer application can also be used to receive specific controls or parameters via the network, such as target values, for regulating the wind turbine via a device predefined with the customer application, for example a mobile phone, and adjust the wind turbine operation as a function of these data.

According to another embodiment, the data received from the customer application via the network are sensor data. The controller is further set up to adjust or process the sensor data received with the customer application with a function stored in the customer application, so as to thereby generate control commands or target values for a controller of the wind turbine, and be able to transfer them as parameters to the core module.

Therefore, functions can be used to design the customer application in such a way as to allow additional sensor data, which can influence wind turbine operation but cannot be provided by the core module, to flow directly into control commands or adjusted target values, and transmit these control commands or target values to the core module. In this way, wind turbine operation can be individually enhanced to consider additional sensors not normally included in the wind turbine environment itself.

According to another embodiment, the core module stores several operating characteristics, several predefined parameters of an operating function in a permitted or defined parameter space and/or several predefined operating functions. By way of the application interface, the controller is further set up to retrieve at least one of the operating functions, use the or one of the parameters for the operating function, or select at least one of the stored operating characteristics, wherein an ability to change the operating characteristics, predefined parameters for the operating function, or predefined operating functions via the application interface is preferably blocked. The application interface is especially preferably secured in such a way as to only, i.e., exclusively, allow a retrieval of the stored operating characteristics and/or the operating functions and/or the parameters for one of the operating functions via the application interface, wherein all other data transmitted from the customer application to the core module are suppressed or not considered by the core module.

Therefore, the core module according to this embodiment only offers the ability to receive as parameters the data received via the application interface from the customer application for selecting operating characteristics or operating functions to be implemented. As a consequence, a completely individual control of operation is impossible, while an especially safe operation of the wind turbine is enabled. The customer application thus provides an individual adjustability of operation to a predetermined extent.

According to another embodiment, the core module can store at least one operating characteristic, which is preferably a speed/power characteristic. The core module is further set up to regulate a feed-in power of the wind turbine as a function of the operating characteristic. In addition, the customer application is preferably set up to provide the operating characteristic for the core module, or to adjust or change the stored operating characteristic.

Therefore, not only are parameters to be transmitted from the customer application, but complete operating characteristics are to be defined for the core module.

The invention further relates to a method for a controller according to one of claims 1 to 13, wherein a customer application is programmed or reprogrammed according to the method via the second programming interface, so as to adjust the controller operation.

In addition, the invention relates to a computer program product that comprises instructions which, when performed on a computer, prompt the computer to implement the method according to claim 14 or which, when performed on a computer, prompt the computer to create a controller according to one of claims 1 to 13.

BRIEF DESCRIPTION OF THE SEVERAL VIEWS OF THE DRAWINGS

Additional embodiments may be derived from the exemplary embodiments described in more detail on the figures. Shown here on.

DETAILED DESCRIPTION

Figure 1:
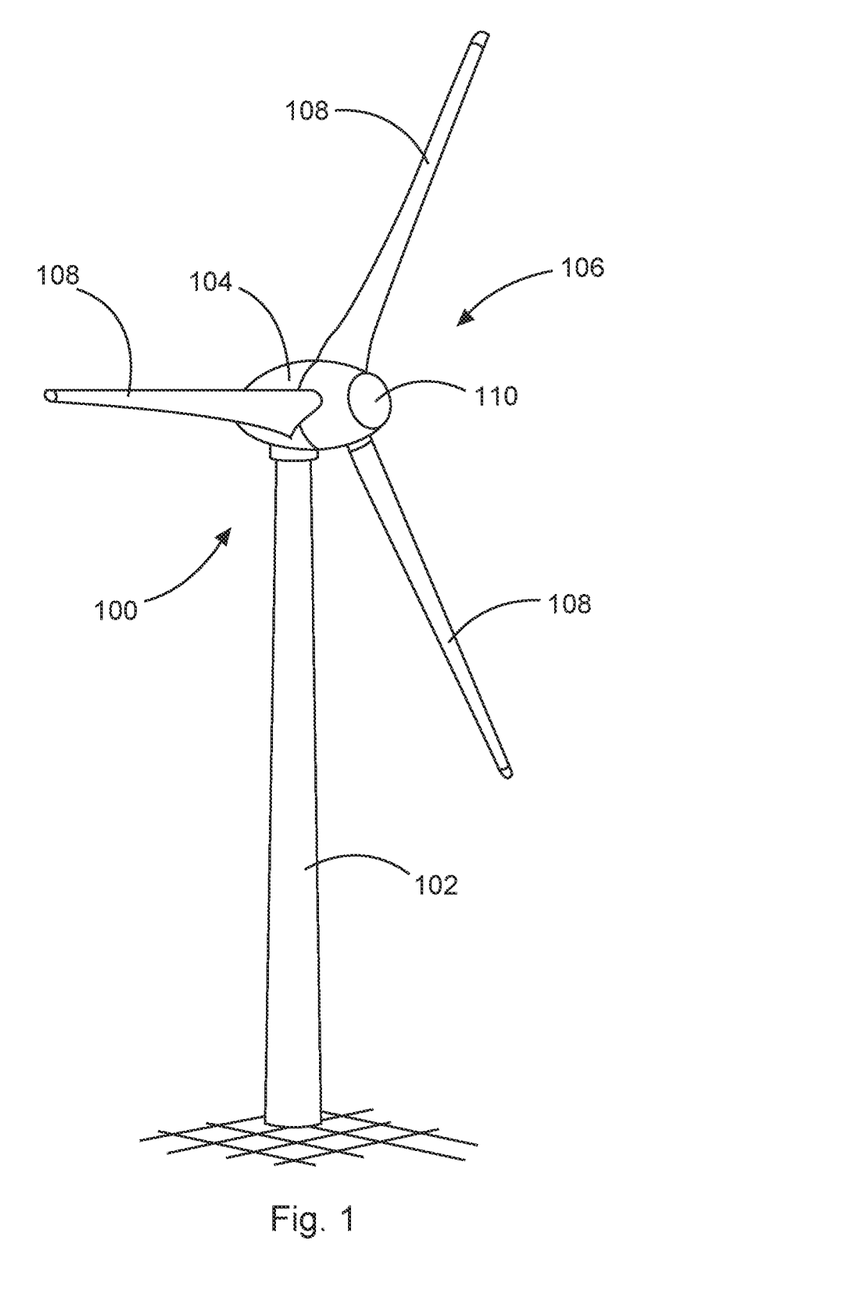
FIG. 1 is a wind turbine.

FIG. 1 shows a schematic view of a wind turbine 100 according to the invention. The wind turbine 100 has a tower 102 and a nacelle 104 on the tower 102. An aerodynamic rotor 106 with three rotor blades 108 and a spinner 110 is provided on the nacelle 104. The aerodynamic rotor 106 is made to rotate by the wind during operation of the wind turbine 10, and thereby also rotates an electrodynamic rotor or armature of a wind turbine generator, which is directly or indirectly coupled with the aerodynamic rotor 106. The electrical wind turbine generator is arranged in the nacelle 104, and generates electrical energy. The pitch angles of the rotor blades 108 can be changed by pitch motors on the rotor blade roots of the respective rotor blades 108.

Figure 2:
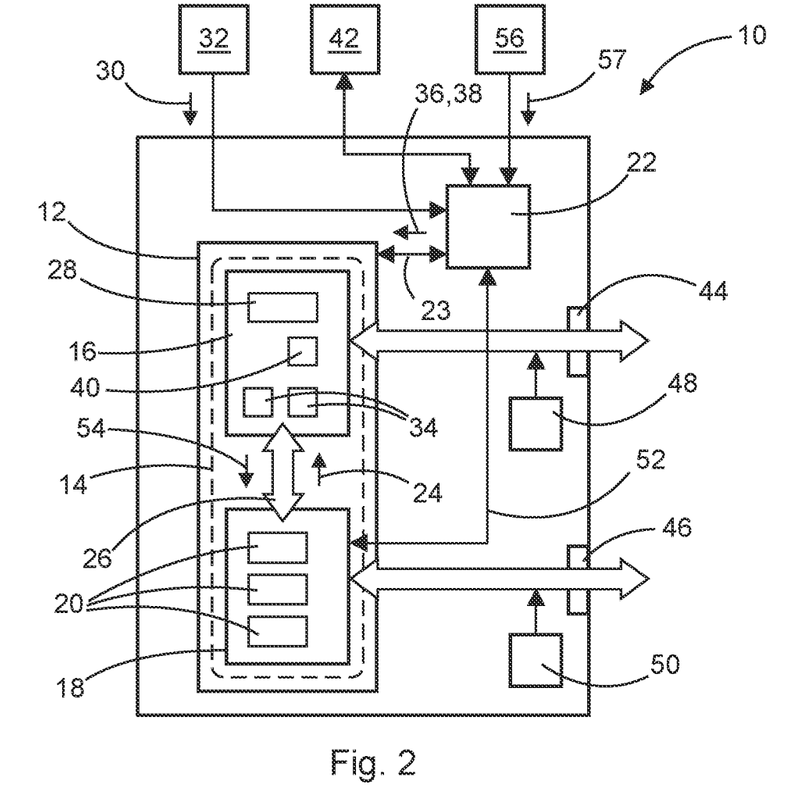
FIG. 2 is a controller for a wind turbine according to a first exemplary embodiment.

FIG. 2 shows a controller 10 for a wind turbine 100. The controller 10 comprises a memory 12 in which data can be stored. In particular, the memory 12 comprises an operating software 14. The operating software 14 further comprises a core module 16 as well as a customer application 18. The customer application 18 stores several functions 20, which are implemented with the help of a processor 22. For this purpose, the processor 22 is connected with the memory 12 via a data link 23. As the output value, the functions 20 deliver a parameter 24, which is transferred to the core module 16 from the customer application 18 via an application interface 26.

The core module 16 is set up to operate the wind turbine 10 as a function of the parameter 24, based upon operating functions 28 stored in the core module 16. During operation of the wind turbine 10, the core module 16 uses the processor 22, in particular with the operating functions 28, to check various sensor values 30 supplied to the processor 22 by sensors 32 during operation of the wind turbine 100.

Several load limits 34 stored in the core module 16 for various components serve to balance the load 36 detected with the processor 22 from the sensor values 30 or a predicted load 38. In the core module 16, the balancing process checks whether the detected load 36 or a predicted load 38 exceeds the corresponding predefined load limit 34. Should this not be the case, the wind turbine 100 is operated with the operating function 28 with consideration of parameter 24. However, should there be a case or should a case be predicted in which the load 36, 38 exceeds the predefined load limit 34, the parameter 24 in operating function 28 is either left unconsidered, and the wind turbine 100 is operated with a parameter 40 determined in the core module 16.

For operation purposes, the controller 10 is connected with a hardware 42 of the wind turbine 100, for example, which likewise delivers its operating status to the processor 22 of the wind turbine 100, so as to thereby determine the load 36, 38 acting on the wind turbine 100.

The controller 10 further comprises a first programming interface 44 and a second programming interface 46. The first programming interface 44 can be used to program or reprogram the core module 16. In particular, it is also possible to set the load limits 34 and adjust the operating functions 28. The second programming interface 46 is set up to program or reprogram the customer applications 18, namely in particular their functions 20. However, the second programming interface 46 is further set up to prevent the core module 16 from being reprogrammed via the second programming interface 46. To this end, the controller 10 comprises a first safety device 48 as well as a second safety device 50. The first safety device 48 protects the first programming interface 44, thereby enabling access to the core module 16 only for authorized persons, for example a manufacturer of the wind turbine 100. The second safety device 50 serves on the one hand to protect access via the second programming interface 46 to the customer application 18 against unauthorized access, but simultaneously also to ensure that the core module 16 cannot be reprogrammed via the second programming interface 46.

The customer application 18 is further connected with the processor 22 via another data link 52, which can also be designed as a programming interface. According to this exemplary embodiment, sensor values 30 of the sensors 32 can thereby be supplied to the customer application 18, namely in particular to the functions 20 of the customer application 18, so as to also generate the parameters 24 as a function of these sensor values 30. According to another exemplary embodiment not shown here but identical except for the following mentioned change, this data link 52 is alternatively not provided between the processor 22 and the customer application 18. According to the alternative exemplary embodiment, the sensor data 30 are thus also transferred via the application interface 26 from the core module 16 to the customer application 18. As a result, sensor data 54 derived from the sensor data 30 with the core module can also be transferred to the customer application 18, and not the sensor data directly 30. Furthermore, a lifetime determining module 56 is connected with the processor 22, which determines a predicted lifetime 57 based upon the past operation of the wind turbine 100 as well as a predicted operation with the operating functions 28 to be implemented, in particular with consideration of the parameters 24. This lifetime is also provided by the processor 22 via the core module 16 and application interface 26 for the customer application 18, so that, after a customer has changed a parameter 24, namely by adjusting a function 20, feedback is obtained as to how the lifetime 57 of the wind turbine 100 changes with consideration of this new parameter 24.

Figure 3:
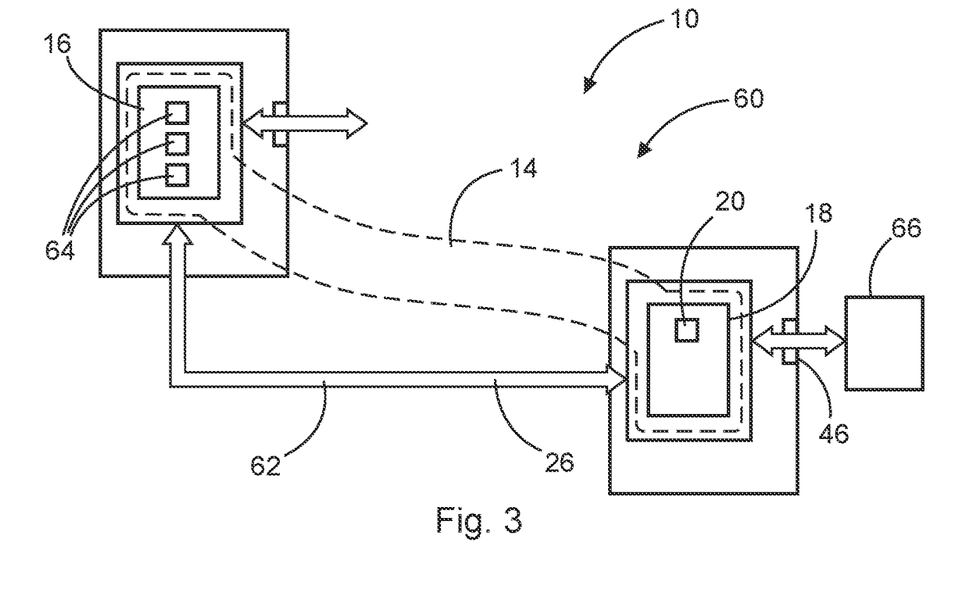
FIG. 3 is a distributed controller for a wind turbine according to a second exemplary embodiment of the invention, and FIG. 4 are the steps of an exemplary embodiment of the method.

FIG. 3 shows a controller 10 that corresponds to a distributed controller 60. The application interface 26 here corresponds to a network connection 62, so that the core module 16 and customer application 18 are locally distant from each other. Nonetheless, the operating software 14 still comprises the core module 16 and customer application 18. In the exemplary embodiment shown here, the function 20 provided in the customer application 18 serves only to select several operating characteristics 64, which are stored in the core module 16, and used to operate the hardware 42, for example namely the generator or also the rotor. For example, the second programming interface 46 can thus be used to adjust the function 20 via a mobile phone or some other mobile device 66, so as thereby select an operating characteristic 64 other than the one previously implemented. The operation of the wind turbine 100 is then adjusted so as to carry out an operation according to the other operating characteristic. However, it is here ensured that the load limits 34 are not exceeded. To this end, for example, a switch is again made in the core module 16 to a previous operating characteristic which ensures a safe operation.

Figure 4:
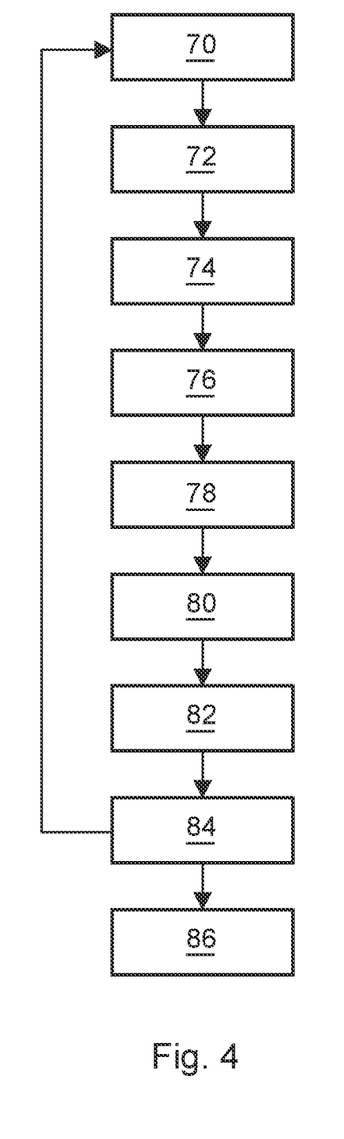

FIG. 4 shows the steps in an exemplary embodiment of the method. A wind turbine 100 is operated in a step 70. The operation is controlled via an operating function 28 in a core module 16 of the wind turbine 100. The wind turbine 100 further receives a function 20 via a second data interface 46 from a user in a step 72. In step 74, this function 20 is stored in a customer application 18. The function 20 is then implemented in the controller 10 of the wind turbine 100 in step 76, and delivers a parameter in step 78. This parameter is transmitted to a core module 16 in step 80, and considered during operation with the operating function 28, so that the operation of the wind turbine 100 is adjusted in step 80. Load limits 34 are considered in step 82, and if the latter are exceeded during changed operation, the parameter 24 transferred to the core module 16 from the customer application 18 via the application interface 26 is in step 84 either modified or replaced by a parameter 40 stored as a standard parameter in the core module 16. As a consequence, in a case where the load limits 34 are exceeded, the wind turbine 100 is again operated with the original operating mode in step 70. In addition, a residual lifetime of the wind turbine 100 is determined in step 86, and provided for the customer application 18.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A controller for a wind turbine with an operating software for operating the wind turbine, wherein the operating software is configured to cause regulation or control of an electrical output of a wind turbine generator, a speed of a wind turbine rotor, an azimuth angle of a wind turbine nacelle, and a pitch angle of at least one rotor blade of the wind turbine rotor, wherein the operating software comprises a core module and a customer application,
   wherein the customer application is configured to determine a parameter, depending on at least one function of the customer application, and provide the parameter for the core module, and
   wherein the core module is configured to:
      at least one of detect or predict a load acting on the wind turbine during an operation of the wind turbine,
      in a case where a detected or predicted load lies below a predefined load limit, to operate the wind turbine as a function of the parameter provided by the customer application, and
      in a case where a detected or predicted load exceeds the predefined load limit, to adjust the prepared parameter and leave the wind turbine unconsidered as a function of the adjusted parameter or the provided parameter, and operate the wind turbine with a parameter determined in the core module,
   wherein the controller has a first programming interface and a second programming interface,
   wherein the first programming interface is configured to program the core module, and
   wherein the second programming interface is configured to program the customer application and prevent the core module from being reprogrammed via the second programming interface.

2. The controller according to claim 1, wherein access to the first programming interface is protected by a first safety device, and access to the second programming interface is protected by a second safety device, wherein the second safety device is different from the first safety device.

3. The controller according to claim 2, wherein the first programming interface is configured to program the load limits, and wherein the second programming interface is configured to program the function of the customer applications.

4. The controller according to claim 1, wherein the customer application is a first customer application, wherein the operating software includes a second customer application that is incorporated into the operating software via the second programming interface.

5. The controller according to claim 1, wherein the controller comprises at least one sensor interface for receiving sensor data from a plurality of sensors of the wind turbine.

6. The controller according to claim 1, wherein the operating software has an application interface between the core module and the customer application so as to receive the parameter.

7. The controller according to claim 6, wherein the parameter comprises a control command or a variable for regulation in the core module or a manipulated variable.

8. The controller according to claim 1, wherein the controller is a component of a wind farm regulator or a wind turbine, or the controller is a distributed controller, which is at least partially a component of a control center, a wind farm regulator, a wind turbine controller, or a remote computer.

9. The controller according to claim 1, wherein the core module is located in the wind turbine or a wind farm regulator, and that the customer application is designed in a control center.

10. The controller according to claim 1, wherein the controller is connected with at least one controllable or regulatable hardware component, and wherein the core module is configured to control or regulate the hardware component as a function of parameters which are received via an application interface from the customer application.

11. The controller according to claim 1, wherein the core module has a conflict management module configured to check parameters received via an application interface from the customer application for conflicts with operating functions implemented by the core module, or for conflicts with parameters received from an additional customer application, and in case of a detected conflict, ignore or adjust the parameters received from the customer application.

12. The controller according to claim 1, wherein the controller is connected with a network and configured to transmit data received from the core module.

13. The controller according to claim 1, wherein state data for the controller or a component coupled to the controller via a network depends on a function of the customer application.

14. The controller according to claim 1, wherein the controller is connected with a network and configured to receive data through the customer application via the network depending on a function of the customer application and to transmit the data to the core module via an application interface.

15. The controller according to claim 14, wherein the data received from the customer application are sensor data, which are adjusted with the function stored in the customer application to thereby generate control commands or target values for the controller of the wind turbine to transfer them as parameters to the core module.

16. The controller according to claim 1, wherein the core module has a plurality of stored operating characteristics, and/or a plurality of predefined operating functions, and/or a plurality of predefined parameters of an operating function, and wherein the controller is configured, by way of an application interface, to retrieve at least one of the plurality of predefined operating functions or select one of the plurality of stored operating characteristics, or implement at least one of the parameters of the operating functions, wherein an ability to change the operating characteristics of the operating functions or the parameters of the operating functions via the application interface is blocked.

17. The controller according to claim 1, wherein the core module is configured to store at least one operating characteristic including a speed/power characteristic, and wherein the core module is configured to regulate a feed-in power of the wind turbine as a function of the operating characteristic.

18. The controller according to claim 17, wherein the customer application is configured to provide the operating characteristic for the core module, or to adjust or change the stored operating characteristic.

19. A method for the controller according to claim 1, wherein the customer application is programmed or reprogrammed via the second programming interface to adjust a controller operation.

20. A non-transitory computer readable medium, storing a computer program thereon, the computer program comprising instructions which, when performed on a computer, prompt the computer to implement the method according to claim 19.

* * * * *